United States Patent
Yasuda et al.

(10) Patent No.: US 7,933,081 B2
(45) Date of Patent: Apr. 26, 2011

(54) FOCUSING DEVICE AND IMAGING DEVICE

(75) Inventors: Akira Yasuda, Chiba (JP); Takeshi Kinoshita, Chiba (JP); Toshihiro Hirai, Chiba (JP)

(73) Assignee: Seiko Precision Inc., Chiba (JP)

( * ) Notice: Subject to any disclaimer, the term of this patent is extended or adjusted under 35 U.S.C. 154(b) by 207 days.

(21) Appl. No.: 11/910,177

(22) PCT Filed: Mar. 17, 2006

(86) PCT No.: PCT/JP2006/305462
§ 371 (c)(1),
(2), (4) Date: Oct. 13, 2009

(87) PCT Pub. No.: WO2006/109433
PCT Pub. Date: Oct. 19, 2006

(65) Prior Publication Data
US 2010/0103542 A1 Apr. 29, 2010

(30) Foreign Application Priority Data

Mar. 31, 2005 (JP) ................................. 2005-104630
Jul. 13, 2005 (JP) ................................. 2005-204567

(51) Int. Cl.
*G02B 7/02* (2006.01)
(52) U.S. Cl. ....................................... 359/824; 359/813
(58) Field of Classification Search .................... 359/824
See application file for complete search history.

(56) References Cited

U.S. PATENT DOCUMENTS

2006/0028743 A1* 2/2006 Yamashita et al. ............. 359/824

FOREIGN PATENT DOCUMENTS

| JP | 01-230004 | 9/1989 |
| JP | 06-011637 | 1/1994 |
| JP | 2002-169110 | 6/2002 |
| JP | 2003-215429 A | 7/2003 |
| JP | 2004-197069 | 7/2004 |
| JP | 2005-027444 | 1/2005 |
| JP | 2005-352132 | 12/2005 |
| WO | WO 2004/059364 A1 | 7/2004 |
| WO | WO 2006/109433 A1 | 10/2006 |

OTHER PUBLICATIONS

Office Action issued by Korean Patent Office for Application No. 10-2007-7022270, dated Jul. 9, 2009, 4 pages total.

* cited by examiner

*Primary Examiner* — Jordan M. Schwartz
*Assistant Examiner* — James C Jones
(74) *Attorney, Agent, or Firm* — Kilpatrick Townsend & Stockton LLP

(57) ABSTRACT

A focusing device of simple construction that is miniaturizable, and an imaging device utilizing the same, are provided. A focusing device (10) comprises an actuator (11), a lens holder (12) that holds lenses (13a) and (13b), and a holder support base (14) upon which the lens holder (12) is installed. The actuator (11) comprises a polymer layer (51), a positive electrode (52) that is formed upon the holder support base (14), and a negative electrode (53) that is formed upon the lens holder (12). When the applied voltage between the positive electrode (52) and the negative electrode (53) rises, the polymer layer (51) deforms radially outward along the positive electrode (52). Along with this deformation of the polymer layer (51), the actuator (11) moves the lens holder (12) along the optical axis.

25 Claims, 10 Drawing Sheets

FOCUSING DEVICE AND IMAGING DEVICE

TECHNICAL FIELD

The present invention relates to a focusing device for adjusting focus, and an imaging device using the same.

BACKGROUND ART

Conventionally, in order to adjust the focal length in imaging devices such as cameras, a lens holder holding a lens is moved in the direction of the optical axis of the lens with an actuator that uses an electromagnetic motor or electrostrictive material, thereby adjusting the distance between the lens and the imaging sensor.
Patent Literature 1: Japanese Patent Application Kokai Publication No. 2003-215429

DISCLOSURE OF INVENTION

Problem to be Solved by the Invention

In recent years, imaging devices have come to be mounted onto compact electronic devices such as mobile phones, and the miniaturization of imaging devices is progressing. In the case where an electromagnetic motor is utilized in a focusing device for adjusting the focal length between a lens and an imaging sensor, mechanisms for transmitting motive power becomes necessary, the construction of the focusing device becomes complex, and therefore miniaturizing the imaging device becomes difficult.

In addition, as disclosed in the Patent Literature 1, even in the case where an electrostrictive actuator is used instead of an electromagnetic motor, guides or springs are necessary to control the expansion and contraction of the electrostrictive material, the mechanism becomes complex, and therefore miniaturizing becomes difficult.

Thus, there is a demand for a focusing device of simple construction that is miniaturizable, and an imaging device utilizing the same.

It is an object of the present invention, being devised in the light of the foregoing circumstances, to provide a focusing device of simple construction that is miniaturizable, and an imaging device utilizing the same.

In order to achieve the above-described object, a focusing device in accordance with the first aspect of the present invention comprises a polymer layer, a primary electrode, and a secondary electrode, wherein the polymer layer deforms along the primary electrode and the focal length is adjusted due to this deformation when voltage is applied between the primary electrode and the secondary electrode.

The focusing device may also furthermore comprise a lens holder capable of moving in the direction of optical axis of the lens, and a holder support base upon which the lens holder is disposed wherein the polymer layer is provided between the holder support base and the lens holder. When voltage is applied between the primary electrode and the secondary electrode, the polymer layer deforms along the primary electrode, and by this deformation the lens holder is moved in the direction of the optical axis.

One surface of the holder support base may also be configured such that the lens holder is held in such a manner that it is movable in the direction of the optical axis by the polymer layer.

It may also be configured such that the primary electrode is formed upon the surface of the holder support base that faces the lens holder, the secondary electrode is formed upon the surface of the lens holder that faces the holder support base, and the polymer layer is disposed between the primary electrode and the secondary electrode.

It may also be configured such that an aperture may be provided on the holder support base, and a cylindrical part is provided upon the lens holder, the cylindrical part functioning as a guide when the lens holder moves in the direction of the optical axis by interdigitating with the aperture of the holder support base.

The polymer layer may also be formed as ring shaped.

The focusing device may also furthermore be provided with a lens holder, with the polymer layer and a lens provided on the inner side thereof. Upon the polymer layer, the lens is held such a manner that it is movable in the direction of the optical axis of the lens. When voltage is applied between the primary electrode and the secondary electrode, the polymer layer deforms along the primary electrode, and according to this deformation the lens may be moved in the direction of the optical axis.

It may also be configured such that a flat board part with an aperture is provided on the lens holder, and the polymer layer is disposed upon the flat board part.

It may also be configured such that the primary electrode is formed upon the flat board part, the secondary electrode is formed on the inner peripheral surface of the aperture of the flat board part, and the polymer layer is disposed between the primary electrode and the secondary electrode.

It may also be configured such that the polymer layer and the lens are closely contacting, such that air does not become trapped between the polymer layer and the lens.

The polymer layer may also have a refractive index identical to that of the lens.

The polymer layer may also be formed in a circular shape.

The focusing device may also furthermore be provided with a lens holder holding the polymer layer, wherein the polymer layer is formed in a lenticular shape. Additionally, when a voltage is applied between the primary electrode and the secondary electrode, the polymer layer deforms along the primary electrode, thus the curvature of the polymer layer changes.

It may also be configured such that a flat board part with an aperture is provided on the lens holder, and the polymer layer is disposed upon the flat board part.

It may also be configured such that the primary electrode is formed upon the flat board part, the secondary electrode is formed upon the inner peripheral surface of the aperture of the flat board part, and the polymer layer is disposed between the primary electrode and the secondary electrode.

The polymer layer may also be formed from polyvinyl chloride.

The polymer layer may also be blended with di-n-butyl phthalate as a plasticizer.

In order to achieve the above-described object, an imaging device in accordance with the second aspect of the present invention comprises the focusing device in accordance with the foregoing first aspect, a board upon which the focusing device is installed, and an imaging sensor disposed upon the board.

Advantages of the Invention

As a result of the present invention, by using a polymer layer that deforms according to applied voltage, a focusing device of simple construction that is miniaturizable, and an imaging device using the same, can be provided.

Figure 1:
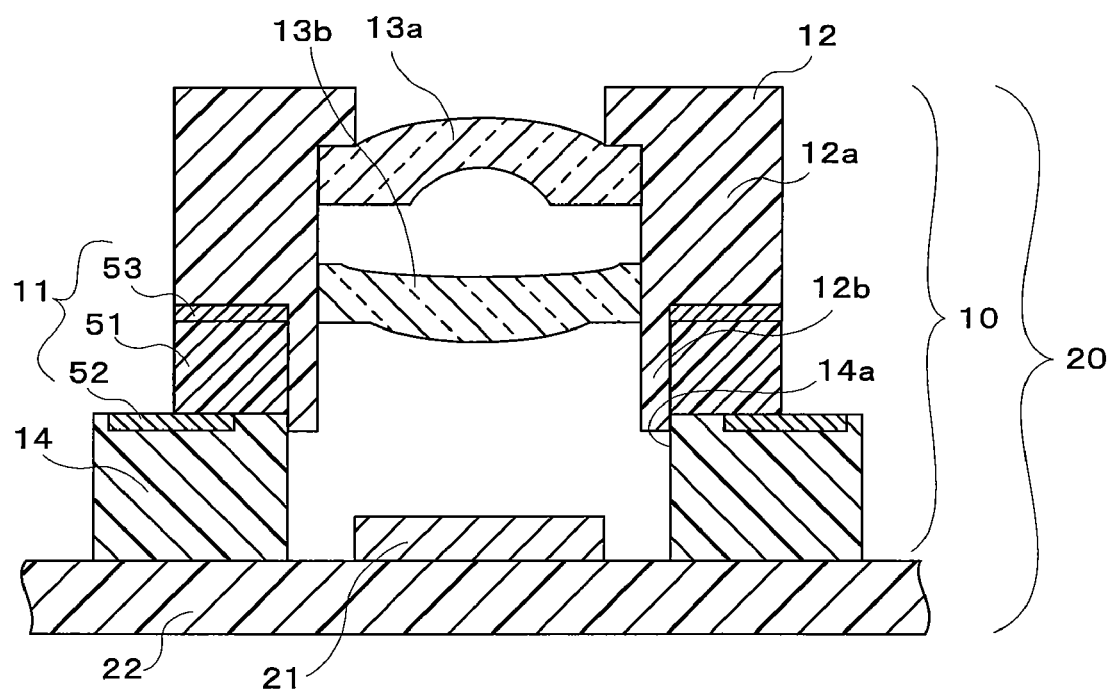
FIG. 1 is a cross-section view of an imaging device in accordance with the first embodiment of the present invention.

EXPLANATION OF REFERENCE NUMERALS 10, 30, 40 Focusing device
11, 31 Actuator
12, 32, 41 Lens holder
13a, 13b, 33a, 33b, 42 Lens
43 Deformable lens
44 Positive electrode
45 Negative electrode
14 Holder support board
20, 25, 26 Imaging device
21 Imaging sensor
22 Printed circuit board

BEST MODE FOR THE EMBODIMENTS OF THE INVENTION

The focusing devices and imaging device in accordance with the embodiments of the present invention will now be described with reference to the accompanying drawings.

First Embodiment

Figure 2:
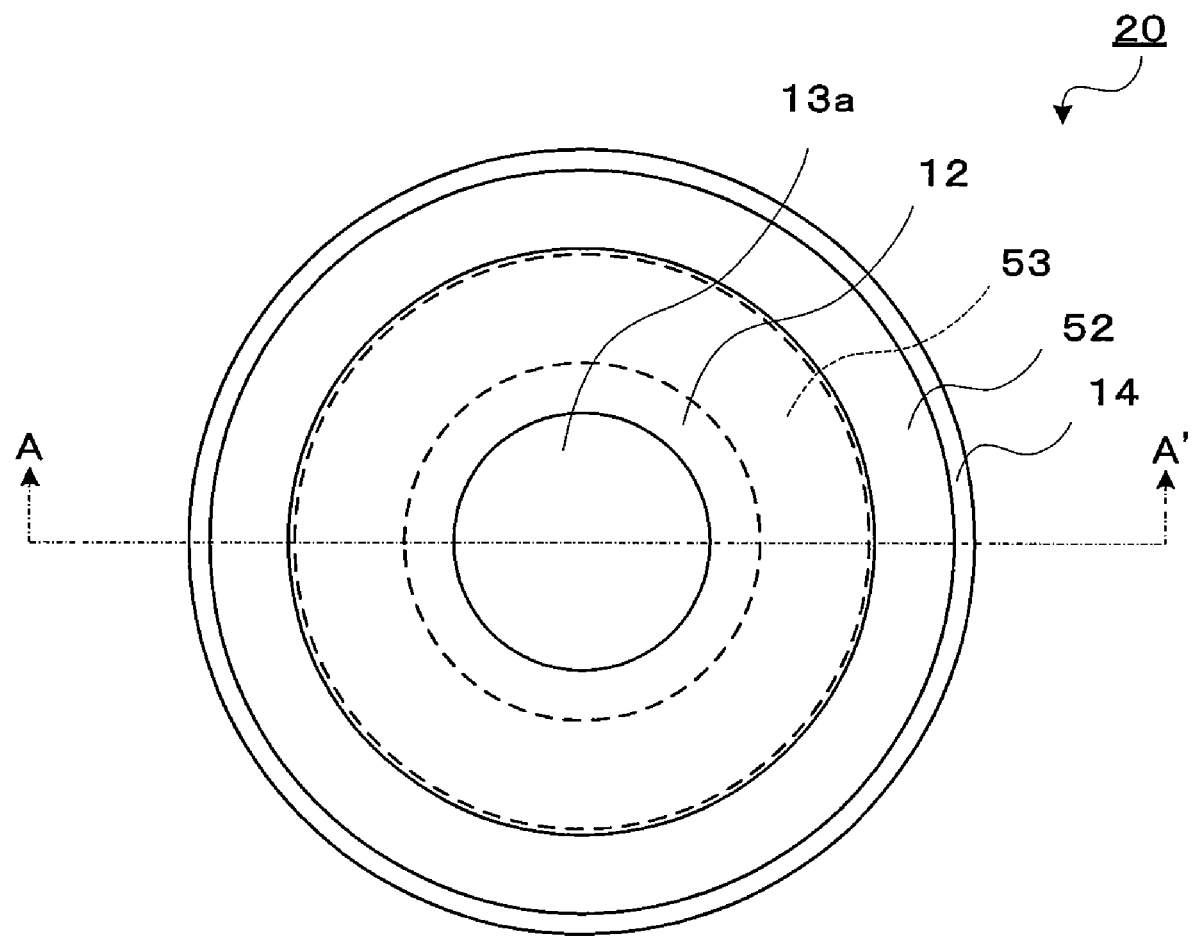
FIG. 2 is a plan view of an imaging device in accordance with the first embodiment of the present invention.
Figure 3:
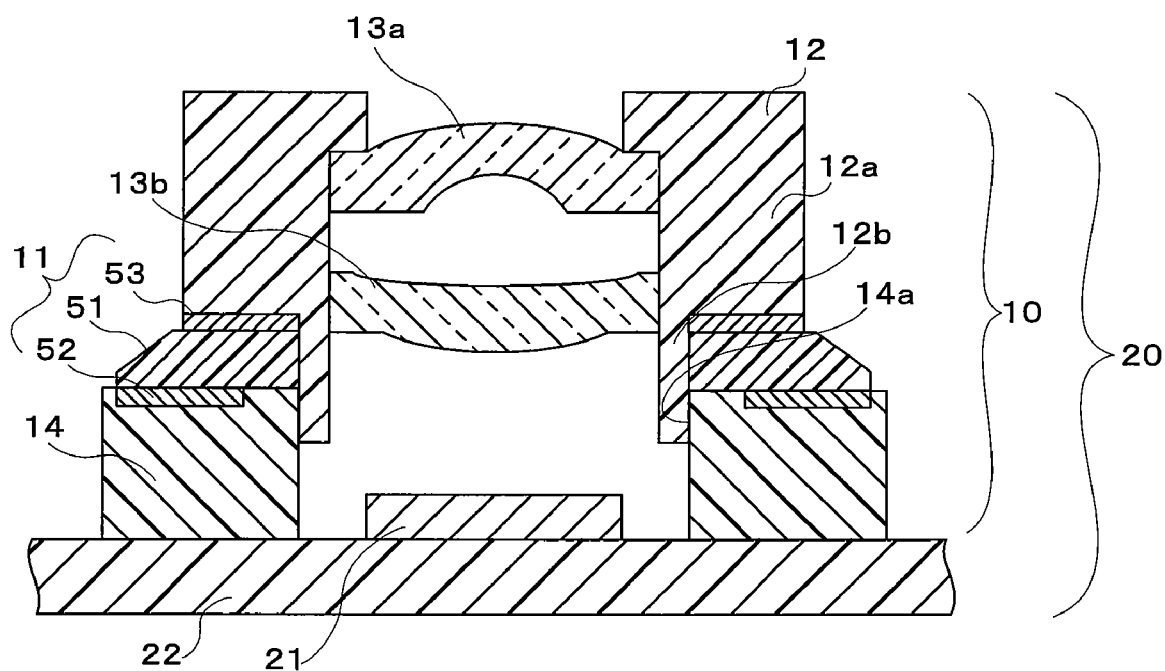
FIG. 3 is a cross-section view of an imaging device in the case where voltage is applied to an actuator of a focusing device in accordance with the first embodiment of the present invention.

An imaging device 20 in accordance with the first embodiment of the present invention is shown in FIGS. 1-3. FIG. 2 is a plan view of the imaging device 20. FIG. 1 is a cross-section view taken along the dashed line A-A' of FIG. 2. In addition, FIG. 3 is a cross-section view schematically illustrating the state when voltage is applied to the focusing device 10.

The imaging device 20 in accordance with the first embodiment of the present invention comprises a focusing device 10, an imaging sensor 21, and a printed circuit board 22, as shown in FIG. 1. The imaging sensor 21 converts an optical image of a subject into an electrical signal. The imaging sensor 21 comprises an CCD (Charge Coupled Device), CMOS (Complementary Metal Oxide Semiconductor) image sensor or similar sensor, and is disposed upon the printed circuit board 22, as shown for example in FIG. 1.

As shown in FIG. 1, the focusing device 10 comprises an actuator 11, a lens holder 12, lenses 13a and 13b, and a holder support base 14.

Figures 4A, 4B:
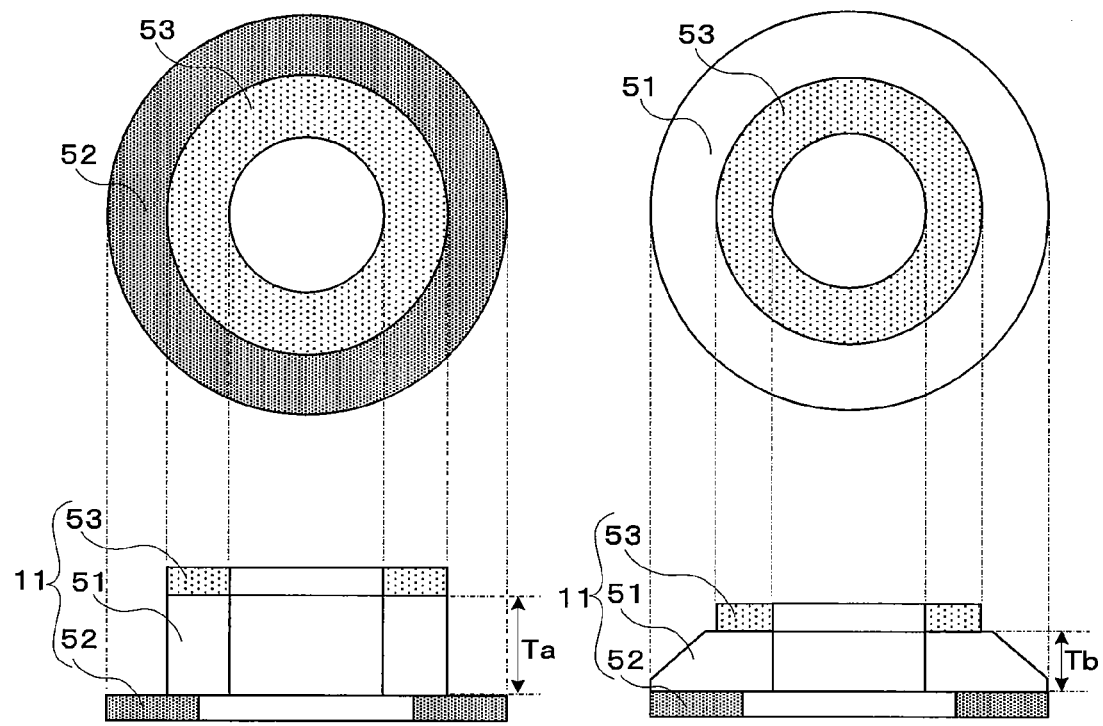
FIG. 4 is a diagram schematically illustrating the operation of an actuator of a 25 focusing device in accordance with the first embodiment of the present invention.

As shown in FIGS. 1, 4(A) and 4(B), the actuator 11 comprises a polymer layer 51, a positive electrode 52 formed on the lower surface of the polymer layer 51, and a negative electrode 53 formed on the upper surface of the polymer layer 51. The actuator 11 is ring-shaped and is disposed between the lens holder 12 and the holder support base 14.

The polymer layer 51 is a blend of polyvinyl chloride and di-n-butyl phthalate, in for example a 1:9 ratio. As shown in FIG. 4(A), the polymer layer 51 is formed in a ring shape when the applied voltage between the positive electrode 52 and the negative electrode 53 is 0, i.e., under default conditions. In addition, as shown in FIG. 1, the polymer layer 51 is installed between the negative electrode 53 formed upon the lens holder 12, and the positive electrode 52 formed upon the holder support base 14.

When the applied voltage between the positive electrode 52 and the negative electrode 53 of the actuator 11 is raised from 0, the polyvinyl chloride of the polymer layer 51 is drawn to the positive electrode 52, and for this reason the polymer layer 51 deforms radially outward so as to cover the positive electrode 52, as shown in FIG. 4(B). The amount of deformation of the polymer layer 51 varies according to the position of the positive electrode 52, the applied voltage, and other such factors. In the present embodiment, in order to cause the polymer layer 51 to deform radially outward and obtain satisfactory change in its thickness along the optical axis of the lenses 13a and 13b, the polymer layer 51 is formed so as to cover approximately half of the positive electrode 52 under default conditions, as shown in FIG. 4(A).

Furthermore, in order to protect the polymer layer 51 from the external environment, the surface thereof may also be coated with a thin membrane having elastic properties, such as polyurethane or polyparaxylylene resin (parylene). In addition, it is possible to suitably change the ratio of polyvinyl chloride to the plasticizer di-n-butyl phthalate according to the required capabilities of the polymer layer 51.

The positive electrode 52 comprises, for example, carbon black, gold, silver, or aluminum, and is formed in a ring shape, as shown in FIG. 4. The positive electrode 52 is formed upon the surface of the holder support base 14 that faces the cylindrical part 12a of the lens holder 12. As described above, when voltage is applied between the positive electrode 52 and the negative electrode 53, the polymer layer 51 deforms along the positive electrode 52. In the present embodiment, in order to satisfactorily cause the polymer layer 51 to deform radially outward, the positive electrode 52 is formed broader in the outward radial direction than the polymer layer 51, as shown in FIG. 4(A).

The negative electrode 53 comprises, for example, carbon black, gold, silver, or aluminum, and is formed in a ring shape, as shown in FIG. 4. The negative electrode 53 is formed on the surface of the cylindrical part 12a of the lens holder 12 that faces the holder support base 14. The positive electrode 52 and the negative electrode 53 are connected to a power source (not shown in the drawings), and are furthermore connected to a drive circuit control part (not shown in the drawings). Voltage is applied according to input from the control part (not shown in the drawings).

When the applied voltage between the positive electrode 52 and the negative electrode 53 of the actuator 11 with the above construction is raised from 0, since the polyvinyl chloride comprising the polymer layer 51 has polarity, the polymer layer 51 extends radially outward so as to cover the positive electrode 52, as shown in FIG. 4(B). As a result of the radial extension of the polymer layer 51, the polymer layer 51 thins out from a thickness Ta to a thickness Tb. Since the lens holder 12 is held in a movable state upon the holder support base 14 by the polymer layer 51, along with the change in thickness of the polymer layer 51, the lens holder 12 moves closer to the imaging sensor 21 in the direction of the optical axis of the lenses 13a and 13b by a distance (Ta-Tb), as shown in FIG. 3. On the other hand, when the applied voltage between the positive electrode 52 and the negative electrode 53 is returned to 0, the polymer layer 51 returns to its original shape, and therefore the lens holder 12 also returns to the state shown in FIG. 1.

As shown in FIG. 1, the lens holder 12 is held in such a manner that it is movable in the direction of the optical axis of the lenses 13a and 13b via the polymer layer 51. As shown in FIGS. 1 and 2, the lens holder 12 comprises a cylindrically-shaped first cylindrical part 12a and a second cylindrical part 12b. The first cylindrical part 12a holds the lenses 13a and 13b on the inner surface of the lens holder 12. The edge of the second cylindrical part 12b interdigitates with the aperture 14a of the holder support base 14 in such a manner that it is movable in the direction of the optical axis of the lenses 13a and 13b. By interdigitating the second cylindrical part 12b of the lens holder 12 with the aperture 14a in this way, when the actuator 11 deforms, the second cylindrical part 12b functions as a guide. Consequently, it is possible for the lens holder 12 to move in the direction of the optical axis of the lenses 13a and 13b without tilting the lenses 13a and 13b. In addition, the negative electrode 53 is formed upon the surface of the first cylindrical part 12a that faces the holder support base 14.

As shown in FIGS. 1 and 2, the holder support base 14 is formed in a ring shape, and is installed upon the printed circuit board 22. The holder support base 14 is provided with an aperture 14a corresponding to the lenses 13a and 13b. In addition, the aperture 14a of the holder support base 14 is slightly larger than the outer radius of the second cylindrical part 12b of the lens holder 12, and is interdigitated by the second cylindrical 12b. The positive electrode 52 is formed upon the surface of the holder support base 14 that faces the first cylindrical part 12a of the lens holder 12.

In the focusing device 10 having the above-described construction, when the applied voltage between the positive electrode 52 and the negative electrode 53 becomes larger than 0, the polymer layer 51 is drawn to the positive electrode 52, deforms along the positive electrode 52, and its thickness reduces due to extending radially outward. To put it differently, this reduction in thickness means that, along with the change in thickness of the polymer layer 51 in the direction of the optical axis of the lenses 13a and 13b, the lens holder 12 moves in the direction of the optical axis of the lenses 13a and 13b so as to come closer to the imaging sensor 21. Consequently, the distance between the imaging sensor 21 and the lenses 13a and 13b shortens, and the focal length is adjusted. In addition, when the applied voltage between the positive electrode 52 and the negative electrode 53 is returned to 0, the polymer layer 51 returns to its original shape, and thus the lens holder 12 returns to its initial position.

In this way, in the focusing device 10 in accordance with an embodiment of the present invention, the lens holder 12 is held upon the holder support base 14 in such a manner that it is movable in the direction of the optical axis of the lenses 13a and 13b via the polymer layer 51 of the actuator 11. Consequently, when the applied voltage is raised between the positive electrode 52 and the negative electrode 53, the actuator 11 is able to move the lens holder 12, with the deformation of the polymer layer 51 in the direction of the optical axis of the lenses 13a and 13b. In this way, since means for transmitting the motive power of the actuator 11 are not necessary, the construction of the focusing device 10 becomes simple, and an imaging device 20 using the focusing device 10 can be easily miniaturized.

Since the degree of deformation of the polymer layer 51 can be changed according to the materials constituting the polymer 51, the applied voltage, etc., it is possible to suitably change these factors to attain the required move distance of the lens holder 12. In addition, it is also possible to configure the applied voltage in multiple stages, such that the position of the lens holder 12 is changed in multiple stages.

Second Embodiment

Figure 5:
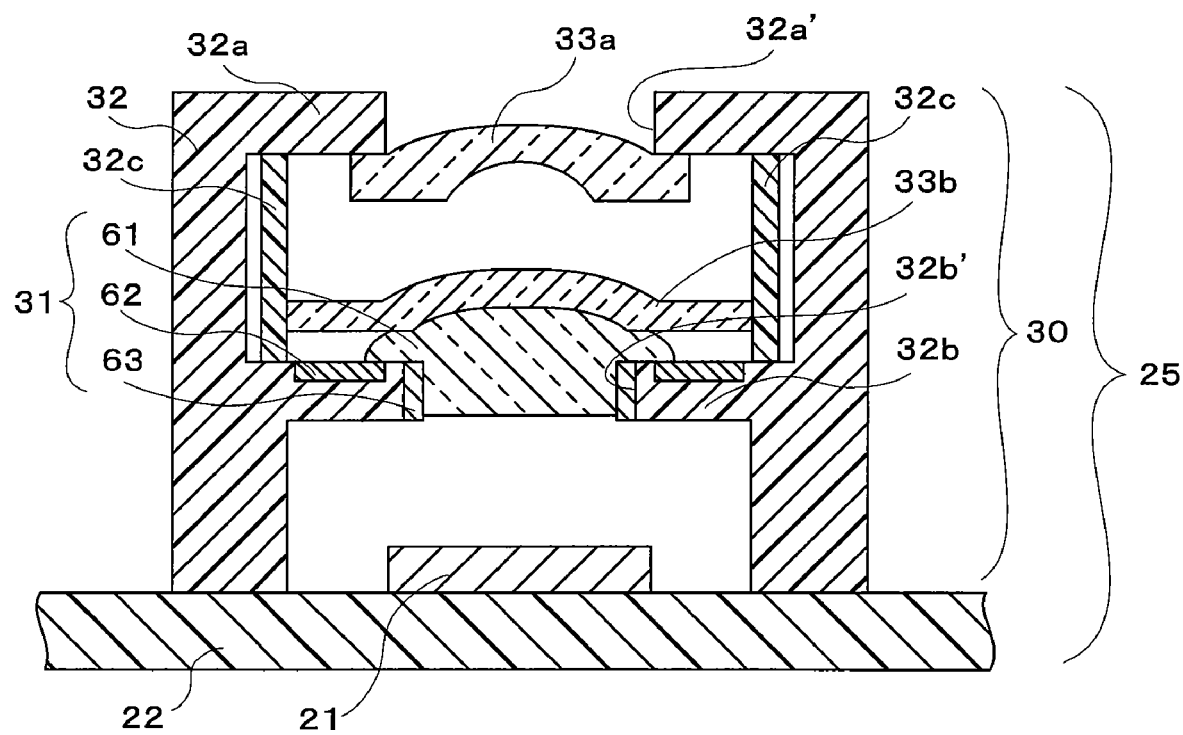
FIG. 5 is a cross-section view of an imaging device in accordance with the second embodiment of the present invention.
Figure 6:
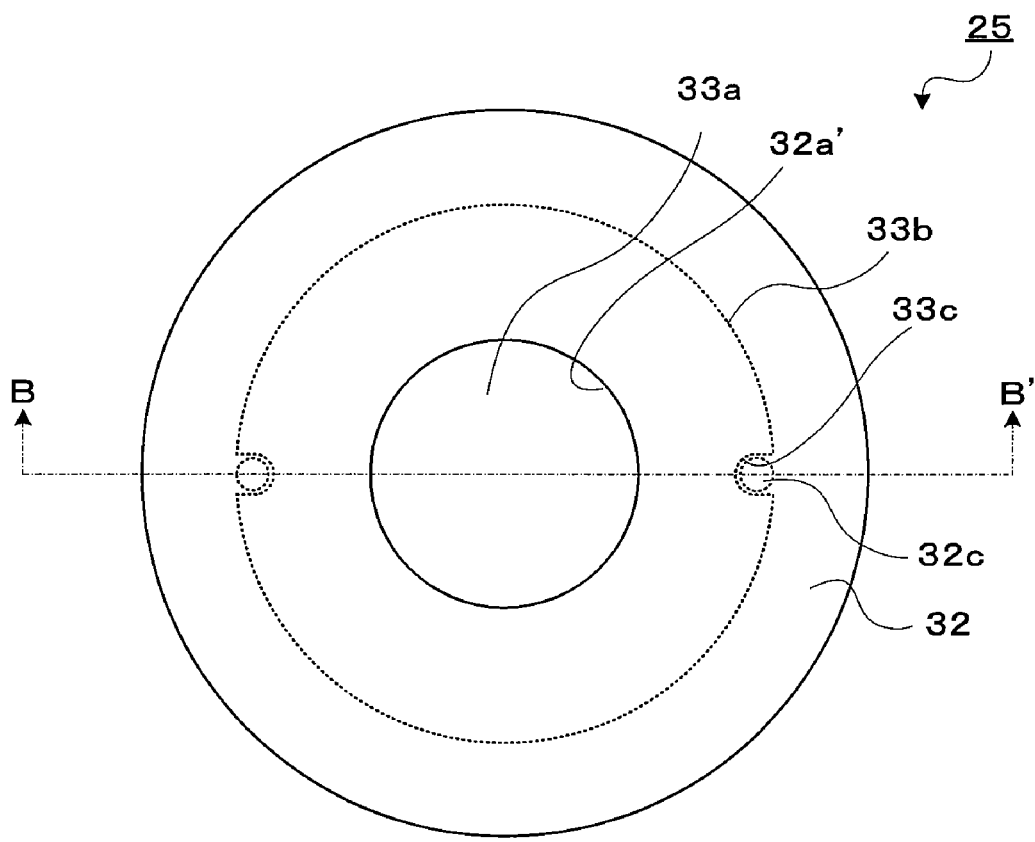
FIG. 6 is a plan view of an imaging device in accordance with the second embodiment of the present invention.
Figure 7:
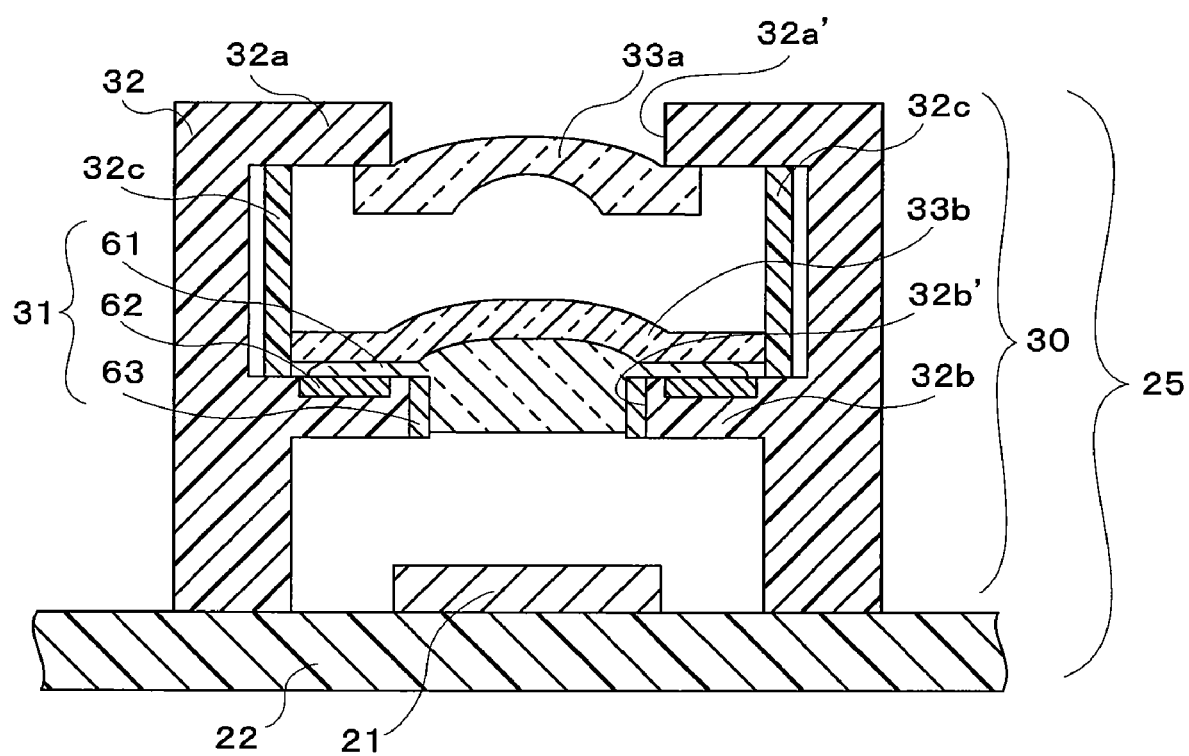
FIG. 7 is a cross-section view of an imaging device in the case where voltage is applied to an actuator of a focusing device in accordance with the second embodiment of the present invention.

An imaging device 25 in accordance with a second embodiment of the present invention is shown in FIGS. 5-7. FIG. 6 is a plan view of the imaging device 25. FIG. 5 is a cross-section view taken along the dashed line B-B' in FIG. 6. In addition, FIG. 7 is a cross-section view schematically illustrating the state when voltage is applied to the focusing device 30. Also, since in FIG. 6 the recessed part 33c formed on the lens 33b, and the guide axis 32c, are described, the illustration of the lens 33a and other parts are abbreviated.

The imaging device 25 in accordance with the second embodiment of the present invention comprises a focusing device 30, an imaging sensor 21, and a printed circuit board 22, in the same manner as the first embodiment. The imaging sensor 21 converts an optical image of a subject into an electrical signal. The imaging sensor 21 comprises a CCD, CMOS image sensor, or other sensor, and is installed upon the printed circuit board 22, as shown in FIG. 5.

As shown in FIG. 5, the focusing device 30 comprises an actuator 31, a lens holder 32, and lenses 33a and 33b.

Figures 8A, 8B:
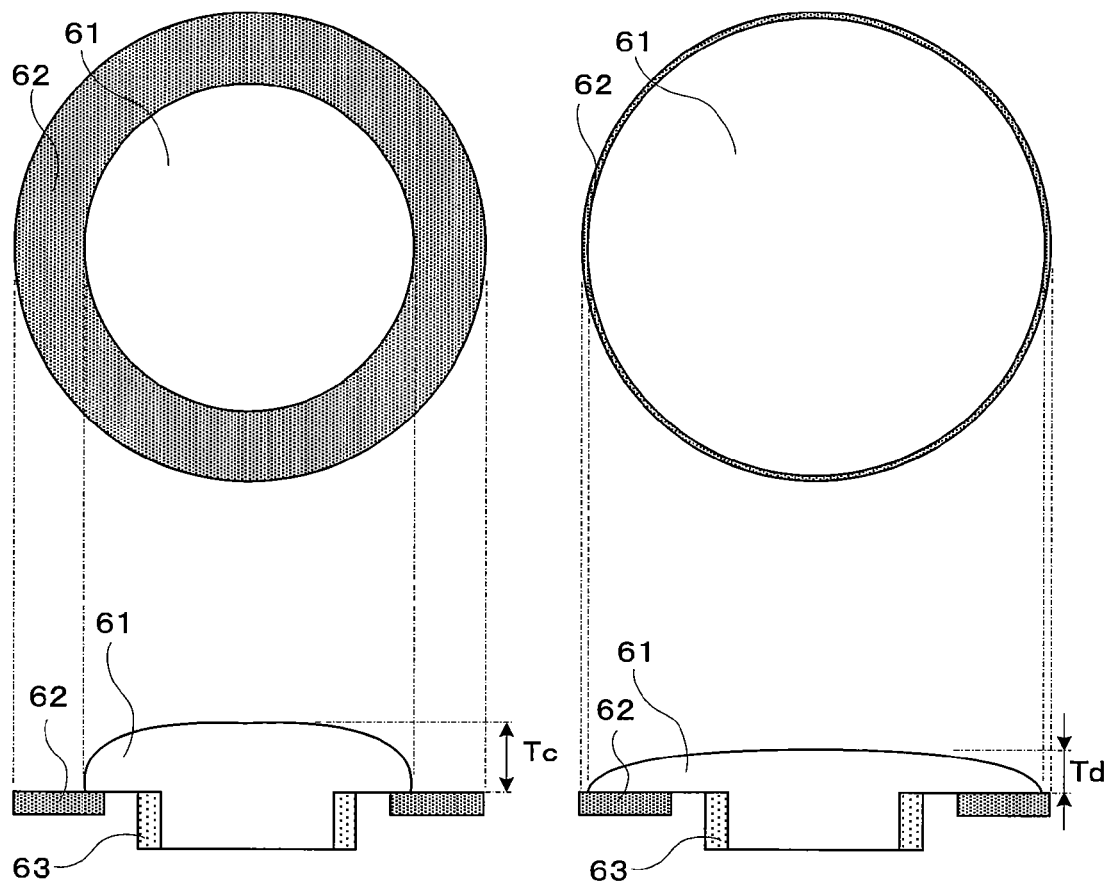
FIG. 8 is a diagram schematically illustrating the operation of an actuator of a focusing device in accordance with the second embodiment of the present invention.

As shown in FIGS. 5, 8(A), and 8(B), the actuator 31 comprises a polymer layer 61, a positive electrode 62 formed upon a flat board part 32b of the lens holder 32, and a negative electrode 63 formed upon the inner peripheral surface of an aperture 32b' of the lens holder 32. The actuator 31, whose planar shape is circular, is disposed upon the flat board part 32b of the lens holder 32. The actuator 31, at least in the region where light passes there through, is disposed with the polymer layer 61 adhering closely to the lens 33b, so that air does not become trapped between the polymer layer 61 and the lens 33b.

The polymer layer 61 is a blend of polyvinyl chloride and a plasticizer di-n-butyl phthalate, in for example a 1:9 ratio. The polymer layer 61 and the lens 33b have identical refractive indices. Consequently, even if the polymer layer 61 is interposed between the lens 33b and the imaging sensor 21, optical images will not be distorted. Furthermore, this is not limited to the case wherein the refractive index of the polymer layer 61 and the refractive index of the lens 33b are identical, and the difference there between may be up to 10%. Even in this case, if the polymer layer 61 is interposed between the lens 33b and the imaging sensor 21, optical images will not be distorted. The polymer layer 61 is formed in a circular shape as shown in FIG. 8(A) when the applied voltage between the positive electrode 62 and the negative electrode 63 is 0, i.e., under default conditions. In addition, the polymer layer 61 is installed between the positive electrode 62 formed upon the flat board part 32b of the lens holder 32 and the negative electrode 63 formed upon the aperture 32b' of the flat board part 32b, as shown in FIG. 5.

When the applied voltage between the positive electrode 62 and the negative electrode 63 of the actuator 31 is raised from 0, the polyvinyl chloride of the polymer layer 61 is drawn to the positive electrode 62, and therefore the polymer layer 61 deforms radially outward so as to cover the positive electrode 62, as shown in FIG. 8(B). The amount of deformation of the polymer layer 61 varies according to the position of the positive electrode 62, the applied voltage, and other such factors. In the present embodiment, in order to cause the polymer layer 61 to deform radially outward and obtain satisfactory change in thickness in the direction of the optical axis of the lenses 33a and 33b, the polymer layer 61 is formed so as to cover approximately half of the positive electrode 62 under default conditions, as shown in FIG. 8(A).

Furthermore, in order to protect the polymer layer 61 from the external environment, the surface thereof may also be coated with a thin membrane having elastic properties, such as for example polyurethane or polyparaxylylene resin (parylene). In addition, it is possible to suitably change the ratio of polyvinyl chloride to the plasticizer di-n-butyl phthalate according to the required capabilities of the polymer layer 61.

The positive electrode 62 comprises, for example, carbon black, gold, silver, or aluminum, and is formed in a ring shape, as shown in FIGS. 8(A) and 8(B). The positive electrode 62 is formed upon the surface of the flat board part 32b of the lens holder 32. As described above, when voltage is applied between the positive electrode 62 and the negative electrode 63, the polymer layer 61 deforms along the positive electrode 62. In the present embodiment, in order to satisfactorily cause the polymer layer 61 to deform radially outward, the positive electrode 62 is formed broader in the outward radial direction than the polymer layer 61, as shown in FIG. 8(A).

The negative electrode 63 comprises, for example, carbon black, gold, silver, or aluminum, and is formed spanning the entire surface of the inner peripheral surface of the aperture 32b' of the lens holder 32, as shown in FIG. 5. The positive electrode 62 and the negative electrode 63 are connected to a power source (not shown in the drawings), and are furthermore connected to a drive circuit control part (not shown in the drawings). Voltage is applied according to input from the control part (not shown in the drawings).

When the applied voltage between the positive electrode 62 and the negative electrode 63 of the actuator 31 having the above construction is raised from 0, since the polyvinyl chloride comprising the polymer layer 61 has polarity, the polymer layer 61 extends radially outward so as to cover the positive electrode 62, as shown in FIG. 8(B). As a result of the radial extension of the polymer layer 61, the polymer layer 61 thins out from a thickness Tc to a thickness Td. Since the lens 33b is disposed in close contact upon the polymer layer 61, along with the change in thickness of the polymer layer 61, the lens 33b moves in the direction of the optical axis of the lenses 33a and 33b so as to come closer to the imaging sensor 21 by a distance (Tc-Td), as shown in FIG. 8. On the other hand, when the applied voltage between the positive electrode 62 and the negative electrode 63 is returned to 0, the polymer layer 61 returns to its original shape, and therefore the lens 33b also returns to the state shown in FIG. 5.

The lens holder 32 is cylindrical in shape and comprises a flat board part 32a that holds the lens 33a, and a flat board part 32b that holds the actuator 31. The flat board part 32a comprises an aperture 32a' corresponding to the lens 32a, and the lens 33a is held in this aperture 32a'. The flat board part 32b also comprises an aperture 32b' corresponding to the lens 33b. The actuator 31 is held in this aperture 32b'. In addition, the positive electrode 62 is formed upon the surface of the flat board 32b that faces the flat board part 32a, and the negative electrode 63 is formed spanning the entire periphery of the inner peripheral surface of the aperture 32b'. The lens 33b is movably mounted to the lens holder 32 via a pair of guide axes 32c, the lens being movable in the direction of the optical axis, and additionally is held at a set position in the direction of the optical axis by the actuator 31. The guide axes 32c are erected parallel to the optical axis of the lens 33b between the flat board part 32a and 32b of the lens holder 32. Recessed parts 33c are formed on the outer peripheral edge of the lens 33b, and the guide axes 32c are slidably fitted into the recessed parts 33c, such that the lens 33b is movable in the optical axis direction along the guide axes 32c In the focusing device 30 having the above-described construction, when the applied voltage between the positive electrode 62 and the negative electrode 63 becomes larger than 0, the polymer layer 61 is drawn to the positive electrode 62, deforms along the positive electrode 62, and its thickness reduces due to extending radially outward. To put it differently, this reduction in thickness means that, along with the change in thickness of the optical axis of the lenses 33a and 33b on the polymer layer 61, the lens 33b moves in the direction of the optical axis of the lenses 33a and 33b so as to come closer to the imaging sensor 21. Consequently, the distance between the imaging sensor 21 and the lenses 33a and 33b shortens, and the focal length is adjusted. In addition, when the applied voltage between the positive electrode 62 and the negative electrode 63 is returned to 0, the polymer layer 61 returns to its original shape, and thus the lens 33b returns to its initial position.

In this way, according to the present invention, since means for transmitting the motive power of the actuator 31 are not necessary, the construction of the focusing device 30 becomes simple, and an imaging device using the focusing device 30 can be easily miniaturized. In addition, since the lens is directly moved in the direction of its optical axis by utilizing the deformation of the actuator, the number of components parts is reduced, and it is possible to further miniaturize the device. In addition, since the refractive index of the polymer layer 61 and the refractive index of the lens 33b are identical, the polymer layer 61 and the lens 33b cooperate and function as a single lens, thus allowing more freedom in lens design. Furthermore, since the lens 33b is provided closely contacting the polymer layer 61, even though the polymer layer 61 deforms, the curvature of the polymer layer 61 is always held fixed by the lens 33b.

Since the degree of deformation of the polymer layer 61 can be changed according to the material constituting the polymer 61, the applied voltage, etc., it is possible to suitably change these factors to attain the required move distance of the lens holder 32. In addition, it is also possible to configure the applied voltage in multiple stages, such that the position of the lens 33b can be changed in multiple stages.

Third Embodiment

A focusing device and imaging device in accordance with a third embodiment of the present invention will now be described with reference to the accompanying drawings. For the parts in common with that of the first embodiment, reference numbers identical to those used in the first embodiment will be appended, and the detailed description thereof will be omitted for the sake of brevity.

Figure 9:
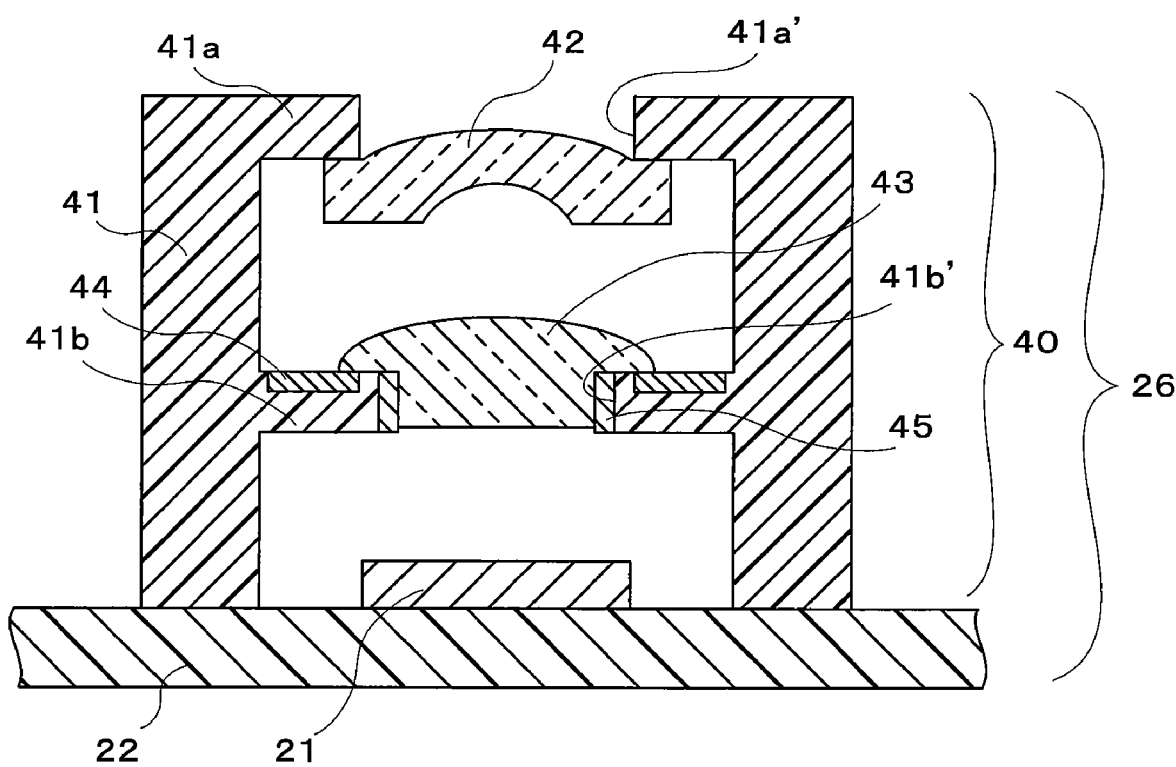
FIG. 9 is a cross-section view of an imaging device in accordance with the third embodiment of the present invention.
Figure 10:
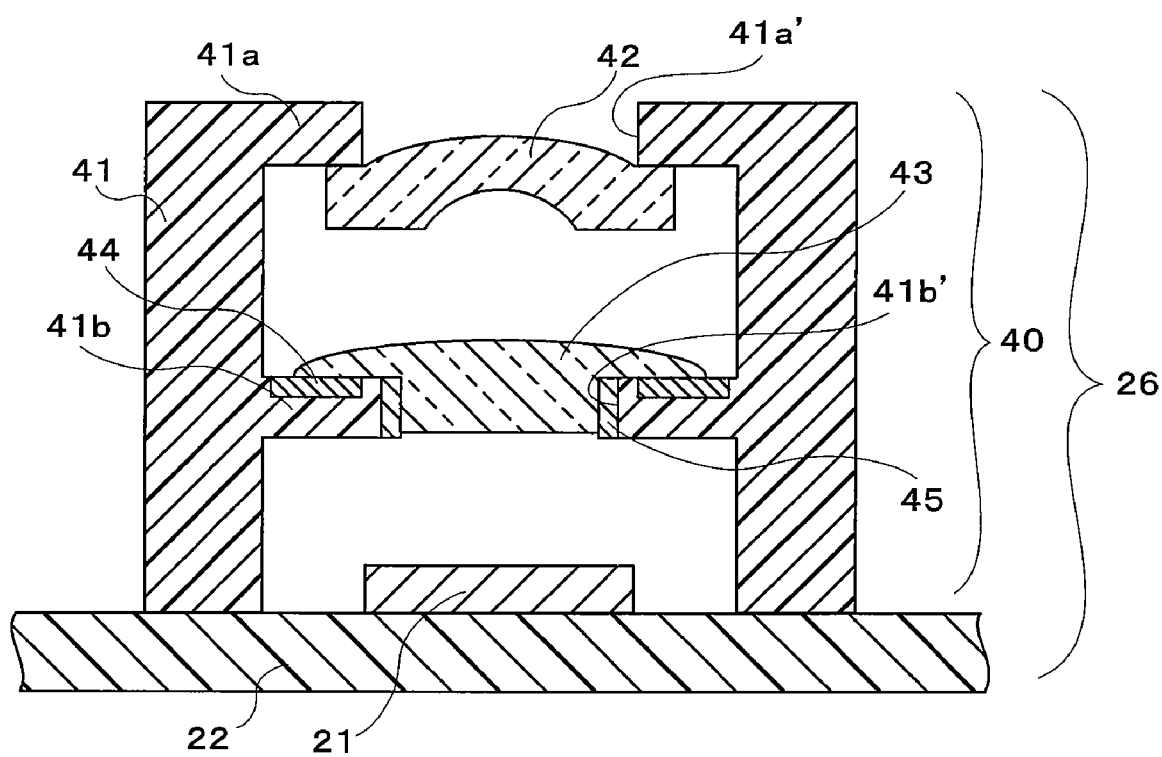
FIG. 10 is a cross-section view of an imaging device in accordance with the third embodiment of the present invention, in the case where voltage is applied to a deformable lens.

FIGS. 9 and 10 show a focusing device 40 and an imaging device 26 in accordance with the third embodiment of the present invention. FIG. 9 is a cross-section view of the imaging device 40. FIG. 10 is a cross-section view of the imaging device 26 in the state when voltage is applied to the focusing device 40.

As shown in FIG. 9, the imaging device 26 in accordance with an embodiment of the present invention comprises a focusing device 40, an imaging sensor 21, and a printed circuit board 22.

The focusing device 40 comprises a lens holder 41, a lens 42, a variable lens 43, a positive electrode 44, and a negative electrode 45.

The lens holder 41, being cylindrical in shape, comprises a first flat board part 41a that holds the lens 42, and a second flat board part 41b that holds the variable lens 43. The first flat board part 41a comprises an aperture 41a' corresponding to the lens 42, wherein the lens 42 is held in this aperture 41a'. In the same manner, the second flat board part 41b also comprises an aperture 41b corresponding to the variable lens 43, wherein the variable lens 43 is held in this aperture 41b'. In addition, the positive electrode 44 is formed on the surface of the second flat board part 41b that faces the first flat board part 41a, and the negative electrode 45 is formed spanning the entire periphery of the inner peripheral surface of the aperture part 41b'.

The lens 42, along with the variable lens 43, collects light from an optical image of a subject. As is described hereinafter, the curvature of the variable lens 43 varies according to the voltage applied between the positive electrode 44 and the negative electrode 45. Meanwhile, the curvature of the lens 42 is fixed.

The variable lens 43 is a blend of polyvinyl chloride and a plasticizer di-n-butyl phthalate, in for example a 1:9 ratio. The variable lens 43 is held on the second flat board part 41b of the lens holder 41, and is installed above the positive electrode 44 formed on the second flat board part 41b such that, in the state where the voltage applied between the positive electrode 44 and the negative electrode 45 is 0 (default state), the variable lens 43 covers approximately half of the positive electrode 44. When a voltage is applied between the positive electrode 44 and the negative electrode 45, the variable lens 43 deforms radially outward. As a result of deforming in this way, the curvature of the variable lens 43 changes. It is furthermore possible to change the blending ratio of the polyvinyl chloride and the di-n-butyl phthalate according to required properties.

As shown in FIG. 9, the positive electrode 44 is formed in a ring shape upon the surface of the second flat board part 41b that faces the first flat board part 41a. As described above, approximately half of the positive electrode 44 is covered by the variable lens 43. As shown in FIG. 9, the negative electrode 45 is formed spanning the entire periphery of the inner peripheral surface of the aperture part 41b' of the second flat board part 41b. In addition, the positive electrode 44 and the negative electrode 45 are connected to a power source (not shown in the drawings), and are furthermore connected to a drive circuit control part (not shown in the drawings). Voltage is applied according to input from the control part (not shown in the drawings).

In the focusing device 40 with the above-described construction, when the applied voltage between the positive electrode 44 and the negative electrode 45 is raised from 0, the polyvinyl chloride constituting the variable lens 43 is drawn to the positive electrode 44, and thus the variable lens 43 deforms so as to extend radially outward, as shown in FIG. 10. As a result of the variable lens 43 broadening radially outward, the curvature radius of the variable lens 43 becomes larger compared to the time when the voltage was 0 (default state). To put it differently, the curvature of the variable lens 43 becomes smaller. Consequently, the focal length of the variable lens 43 can be made longer.

As described above, by using a variable lens 43 that deforms according to the applied voltage, the focusing device 40 is able to change the curvature of the variable lens 43 itself and adjust the focal length. Typically, in order to change the focal length, a method for changing the distance between the lens and the imaging sensor is adopted. In the present invention, however, since the curvature of the lens itself is changed, it is not necessary to move the lens, and it is possible to simplify the construction of the focusing device. Consequently, the imaging device can be easily miniaturized.

It is furthermore possible to change the degree to which the curvature varies by varying the applied voltage between the positive electrode and the negative electrode and the variable lens material, etc. In addition, since the deformation of the variable lens also changes according to the magnitude of the applied voltage, it is also possible to configure the applied voltage between the positive electrode and the negative electrode in multiple stages, such that the curvature of the variable lens varies in multiple stages.

The present invention is not limited to the respective embodiments described above, and various modifications and applications thereof are possible. For example, in the first embodiment, a configuration was offered as an example and described, wherein the positive electrode 52 is formed upon the holder support base 14, the negative electrode 53 is formed upon the lens holder 12, and the polymer layer 51 deforms radially outward. Not being limited thereto, it is possible to optionally change the locations whereupon the positive electrode 52 and the negative electrode 53 are formed, and the direction in which the polymer layer 51 is deformed. For example, it is possible to adopt a configuration wherein the positive electrode 52 is formed upon the lens holder 12, and the negative electrode 53 is formed upon the holder support base 14. It is also possible to adopt configurations wherein the polymer layer 51 deforms radially inward, deforms in the direction of the optical axis of the lenses 13a and 13b, etc.

In addition, in the above-described first embodiment, the case wherein the actuator 11 is provided between the lens holder 12 and the holder support base 14 was offered as an example and described, but the invention is not to be limited thereto, and the actuator 11 may be provided between the printed circuit board 22 and the lens holder 12 without providing the holder support base 14, or the holder support base 14 and the printed circuit board 22 may be formed in a single body.

In the above-described first embodiment, the case wherein the actuator 11 is formed in a ring shape was offered as an example and described. However, not being limited thereto, it is also possible to adopt a configuration wherein, for example, a plurality of actuators 11 are installed at several locations between the lens holder 12 and the holder support base 14, and deformed respectively, thereby causing the lens holder 12 to move in the direction of the optical axis of the lenses 13a and 13b.

In addition, in the above-described second embodiment, a configuration was offered as an example and described, wherein the positive electrode 62 was formed upon the flat board part 32b of the lens holder 32, the negative electrode 63 was formed in the peripheral direction of the aperture part 32b', and the polymer layer 61 deforms radially outward. However, not being limited thereto, it is possible to optionally change the locations at which the positive electrode 62 and the negative electrode 63 are formed, and the direction in which the polymer layer 61 deforms. For example, it is possible to adopt a configuration wherein the positive electrode 62 is formed upon the lens holder 32, the negative electrode 63 is formed upon holder support base, and the polymer layer 61 deforms in the direction of the optical axis of the lenses 33a and 33b. In addition, it is possible to adopt a configuration where the polymer layer 61 deforms radially inward.

In addition, in the above-described second embodiment, the refractive index of the polymer layer 61 and the refractive index of the lens 33b were made to be identical, so that the polymer layer 61 and the lens 33b would cooperate and function as a single lens. However, the refractive index of the polymer layer 61 and the refractive index of the lens 33b may also be suitably changed so that the polymer layer 61 and the lens 33b cooperate and function as a compound lens. For example, by changing the blending ratio of the plasticizer that constitutes the polymer layer 61 to change the refractive index of the polymer layer 61, the refractive index of the polymer layer 61 and the refractive index of the lens 33b may be suitably changed such that the polymer layer 61 and the lens 33b cooperate and function as a compound lens.

In addition, in the above-described second embodiment, a configuration was offered as an example and described, wherein the polymer layer 61 was formed in a circular shape. However, not being limited thereto, it is also possible to form the polymer layer in a ring shape, as in the first embodiment. Likewise, in the first embodiment, the case wherein the polymer layer 51 is formed in a ring shape was offered as an example and described, but it is also possible to form the polymer layer 51 in a circular shape in the same manner as the second embodiment.

In each of the above-described embodiments, the case wherein polyvinyl chloride is used was offered as an example and described, but it is possible to use a material other than polyvinyl chloride, if the material has the property of deforming according to the applied voltage between the positive electrode and the negative electrode.

In addition, in each of the above-described embodiments, a configuration was offered as an example and described, wherein two lenses were used for condense an optical image of an object. However, not being limited thereto, it is also possible to adopt a configuration that uses three lenses.

The present application claims the benefits of Japanese Patent Application No. 2005-104630, filed on Mar. 31, 2005, and Japanese Patent Application No. 2005-204567, filed on Jul. 13, 2005, which are incorporated herein in their entirety.

INDUSTRIAL APPLICABILITY

As a result of the present invention, by using a polymer layer that deforms according to applied voltage, a focusing device of simple construction that is miniaturizable, and an imaging device using the same, can be provided.

The invention claimed is:

1. A focusing device, being comprised of:
a polymer layer;
a primary electrode;
a secondary electrode; and
a lens holder that holds a lens, and is movable in the direction of the optical axis of the lens; and
a holder support base that supports the lens holder such that the lens holder is movable in the direction of the optical axis of the lens, the holder support base being disposed opposite to the lens holder in a direction along the optical axis,
wherein the polymer layer deforms along the primary electrode when voltage is applied between it and the secondary electrode, and the focal length is adjusted due to the deformation,
wherein the polymer layer is provided between the holder support base and the lens holder, the polymer layer deforming along the primary electrode when voltage is applied between it and the secondary electrode, and the lens holder moves along the optical axis due to the deformation.

2. The focusing device according to claim 1, wherein:
the lens holder is held on the surface of the holder support base in such a manner that it is movable by the polymer layer in the direction of the optical axis.

3. The focusing device according to claim 1, wherein:
the primary electrode is formed on the surface of the holder support base that faces the lens holder, the secondary electrode is formed on the surface of the lens holder that faces the holder support base, and the polymer layer is installed between the primary and the secondary electrodes.

4. A focusing device, being comprised of:
a polymer layer;
a primary electrode;
a secondary electrode;
a lens holder that holds a lens, and is in addition movable in the direction of the optical axis of the lens; and
a holder support base, with the lens holder installed thereupon,
wherein the polymer layer deforms along the primary electrode when voltage is applied between it and the secondary electrode, and the focal length is adjusted due to the deformation,
wherein the polymer layer is provided between the holder support base and the lens holder, the polymer layer deforming along the primary electrode when voltage is applied between it and the secondary electrode, and the lens holder moves along the optical axis due to the deformation,
wherein an aperture is provided on the holder support base, and a cylindrical part is provided on the lens holder, wherein the cylindrical part acts as a guide when the lens holder moves in the direction of the optical axis by interdigitating with the aperture of the holder support base.

5. The focusing device according to claim 1, wherein:
the ring shaped polymer layer is used as the polymer layer.

6. A focusing device, being comprised of:
a polymer layer;
a primary electrode;
a secondary electrode; and
a lens holder, being comprised of a polymer layer and a lens on the inner side thereof,
wherein the polymer layer deforms along the primary electrode when voltage is applied between it and the secondary electrode, and the focal length is adjusted due to the deformation,
wherein the lens is held upon the polymer layer such that it is movable in the direction of the optical axis of the lens, the polymer layer deforms along the primary electrode when voltage is applied between it and the secondary electrode, and the lens moves along the optical axis due to the deformation,
wherein the lens is disposed so that it contacts an opposing surface of the polymer layer, such that air cannot be trapped between the polymer layer and the lens.

7. A focusing device, being comprised of:
a polymer layer;
a primary electrode;
a secondary electrode; and
a lens holder, being comprised of a polymer layer and a lens on the inner side thereof,
wherein the polymer layer deforms along the primary electrode when voltage is applied between it and the secondary electrode, and the focal length is adjusted due to the deformation,
wherein the lens is held upon the polymer layer such that it is movable in the direction of the optical axis of the lens, the polymer layer deforms along the primary electrode when voltage is applied between it and the secondary electrode, and the lens moves along the optical axis due to the deformation,
wherein a flat board part, being comprised of an aperture is provided upon the lens holder, and the polymer layer is installed upon the flat board part.

8. The focusing device according to claim 7, wherein:
the primary electrode is formed upon the flat board part, the secondary electrode is formed on the inner peripheral surface of the aperture of the flat board part, and the polymer layer is installed between the primary and secondary electrodes.

9. A focusing device, being comprised of:
a polymer layer;
a primary electrode;
a secondary electrode;
a lens holder, being comprised of a polymer layer and a lens on the inner side thereof,
wherein the polymer layer deforms along the primary electrode when voltage is applied between it and the secondary electrode, and the focal length is adjusted due to the deformation,
wherein the lens is held upon the polymer layer such that it is movable in the direction of the optical axis of the lens, the polymer layer deforms along the primary electrode when voltage is applied between it and the secondary electrode, and the lens moves along the optical axis due to the deformation,
wherein a polymer layer with a refractive index identical to that of the lens is used as the polymer layer.

10. A focusing device, being comprised of:
a polymer layer;
a primary electrode;
a secondary electrode; and
a lens holder, being comprised of a polymer layer and a lens on the inner side thereof,
wherein the lens is held upon the polymer layer such that it is movable in the direction of the optical axis of the lens, the polymer layer deforms along the primary electrode when voltage is applied between it and the secondary electrode, and the lens moves along the optical axis due to the deformation,
wherein the polymer layer deforms along the primary electrode when voltage is applied between it and the secondary electrode, and the focal length is adjusted due to the deformation,
a polymer layer formed in a solid circular shape is used as the polymer layer.

11. A focusing device, being comprised of:
a polymer layer;
a primary electrode;
a secondary electrode; and
a lens holder that holds the polymer layer;
wherein the polymer layer deforms along the primary electrode when voltage is applied between it and the secondary electrode, and the focal length is adjusted due to the deformation,
wherein the polymer layer is formed in a lenticular shape and acts as a lens, and additionally, the polymer layer deforms along the primary electrode when voltage is applied between it and the secondary electrode, and thereby the curvature of the polymer layer varies.

12. A focusing device, being comprised of:
a polymer layer;
a primary electrode;
a secondary electrode; and
a lens holder that holds the polymer layer;
wherein the polymer layer deforms along the primary electrode when voltage is applied between it and the secondary electrode, and the focal length is adjusted due to the deformation,
wherein the polymer layer is formed in a lenticular shape, and additionally, the polymer layer deforms along the primary electrode when voltage is applied between it and the secondary electrode, and thereby the curvature of the polymer layer varies,
wherein a flat board part, being comprised of an aperture is provided upon the lens holder, the flat board part comprising an aperture, and the polymer layer is installed upon the flat board part.

13. The focusing device according to claim 12, wherein:
the primary electrode is formed upon the flat board part, the secondary electrode is formed on the inner peripheral surface of the aperture of the flat board part, and the polymer layer is installed between the primary and secondary electrodes.

14. A focusing device, being comprised of:
a polymer layer;
a primary electrode; and
a secondary electrode,
wherein the polymer layer deforms along the primary electrode when voltage is applied between it and the secondary electrode, and the focal length is adjusted due to the deformation,
wherein a polymer layer formed from polyvinyl chloride is used as the polymer layer.

15. A focusing device, being comprised of:
a polymer layer;
a primary electrode; and
a secondary electrode,
wherein the polymer layer deforms along the primary electrode when voltage is applied between it and the secondary electrode, and the focal length is adjusted due to the deformation,
wherein di-n-butyl phthalate is blended into the polymer layer as a plasticizer.

16. An imaging device, comprising:
the focusing device according to claim 1;
a board, the focusing device being installed thereupon; and
an imaging sensor disposed upon the board.

17. An imaging device, comprising:
the focusing device according to claim 4;
a board, the focusing device being installed thereupon; and
an imaging sensor disposed upon the board.

18. An imaging device, comprising:
the focusing device according to claim 6;
a board, the focusing device being installed thereupon; and
an imaging sensor disposed upon the board.

19. An imaging device, comprising:
the focusing device according to claim 7;
a board, the focusing device being installed thereupon; and
an imaging sensor disposed upon the board.

20. An imaging device, comprising:
the focusing device according to claim 9;
a board, the focusing device being installed thereupon; and
an imaging sensor disposed upon the board.

21. An imaging device, comprising:
the focusing device according to claim 10;
a board, the focusing device being installed thereupon; and
an imaging sensor disposed upon the board.

22. An imaging device, comprising:
the focusing device according to claim 11;
a board, the focusing device being installed thereupon; and
an imaging sensor disposed upon the board.

23. An imaging device, comprising:
the focusing device according to claim 12;
a board, the focusing device being installed thereupon; and
an imaging sensor disposed upon the board.

24. An imaging device, comprising:
the focusing device according to claim 14;
a board, the focusing device being installed thereupon; and
an imaging sensor disposed upon the board.

25. An imaging device, comprising:
the focusing device according to claim 15;
a board, the focusing device being installed thereupon; and
an imaging sensor disposed upon the board.

* * * * *